Patented July 14, 1936

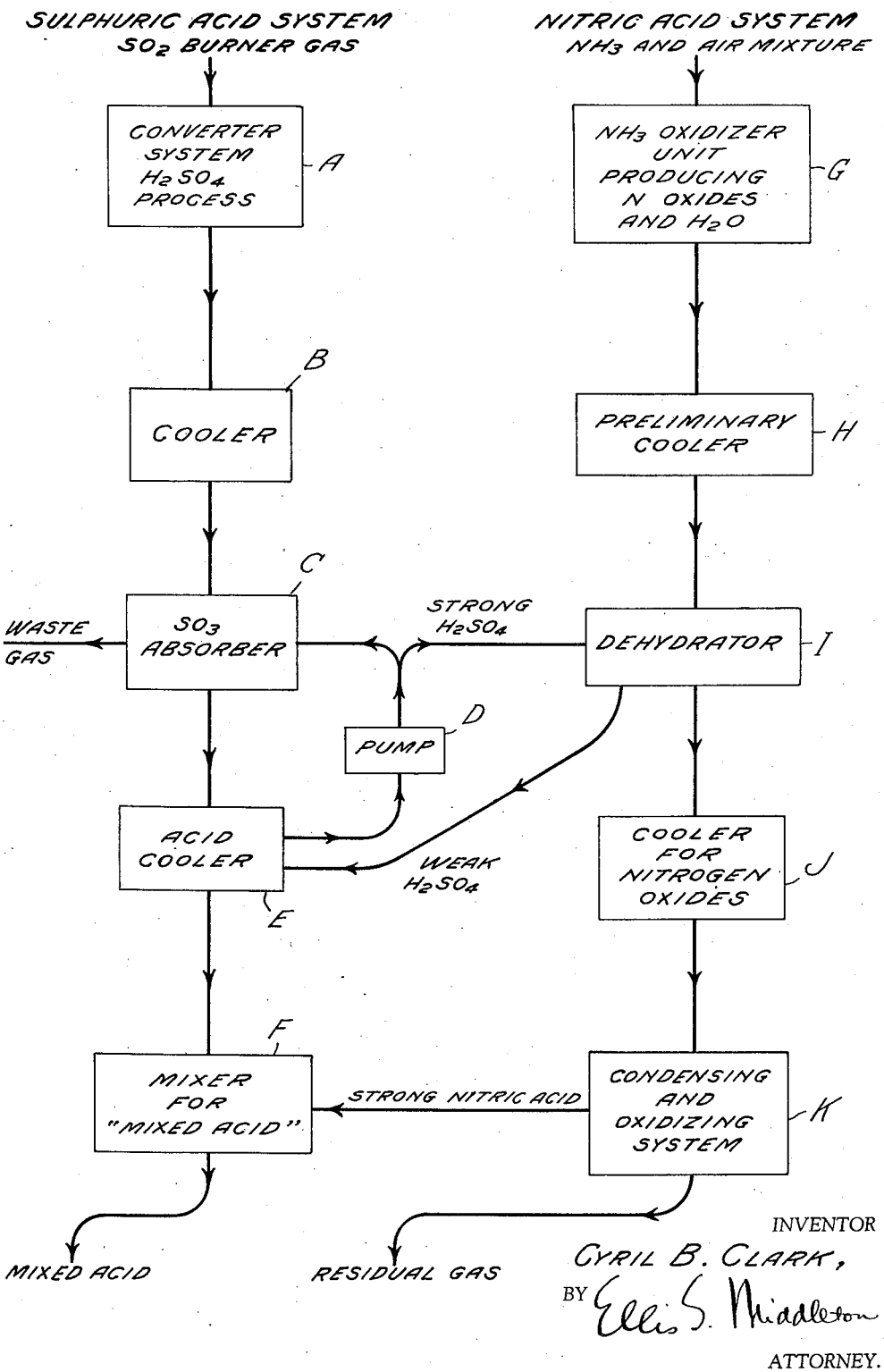

2,047,546

UNITED STATES PATENT OFFICE 2,047,546

PROCESS FOR MAKING MIXED NITRIC AND SULPHURIC ACIDS

Cyril B. Clark, Scarsdale, N. Y., assignor, by mesne assignments, to American Cyanamid & Chemical Corporation, a corporation of Delaware Application March 25, 1930, Serial No. 438,726

2 Claims. (Cl. 23—162)

My invention relates to the manufacture of so-called mixed acid, that is to say, a synthetic mixture of strong nitric acid and strong sulphuric acid or oleum in different proportions, and more particularly to a unitary and continuous process for such manufacture of mixed acid whereby various grades of mixed acid may be advantageously produced with varying composition by unifying the separate operations for the usual formation of concentrated nitric and sulphuric acid.

Mixed acid is employed for the nitrating of glycerine and cellulose compounds, and consists generally in very strong mixtures of nitric acid ($HNO_3$) and sulphuric acid ($H_2SO_4$). To produce the desired grade of such mixed acid it is necessary to make a very strong nitric acid (preferably above 90% $HNO_3$ and where possible 95% $HNO_3$). The balance of this nitric acid is water and acts to dilute the product undesirably after mixing. To counteract the water content in such nitric acid, it is usual to mix oleum (sulphuric acid containing sulphuric anhydride, $SO_3$) with the nitric acid. The $SO_3$ combines with the water in the nitric acid to form $H_2SO_4$. By this procedure it is possible to form a mixed acid containing no free water.

In known methods used for making this mixed acid, the nitric acid was usually produced from nitrate of soda by treatment with sulphuric acid followed by condensation of the evolved nitric acid. According to such process an average nitric acid of 90% strength can be obtained with an acid of 95% strength during part of the operation. This latter acid of 95% strength is generally reserved for the production of mixed acid.

In more recent known methods nitric acid is produced by the oxidation of ammonia with oxygen or gases containing oxygen. One of the drawbacks of this process is the large amount of water produced in the oxidation reaction with the result that a strong nitric acid cannot be produced by the condensation of the resulting reaction products. The ammonia oxidation reaction may be expressed as follows:—

$$NH_3 + 2O_2 = HNO_3 + H_2O$$

Theoretically it should be possible to obtain an acid titrating 77.7% from such reaction, but as a matter of actual practice nitric acid of about 50% strength is the maximum attainable. Again when the oxidation of the ammonia is conducted under pressure, a stronger acid may be produced.

These processes, however, do not give the strong nitric acid of 95% strength which can be obtained from the nitrate of soda plant, and which is desirable for the production of mixed acid. In certain other methods of ammonia oxidation, the gases from the ammonia oxidizer are dried, and then the oxides of nitrogen subsequently condensed by liquefaction and subsequently oxidized to nitric acid. In all of these methods it is desirable to obtain strong nitric acid and yet avoid the expensive concentrations needed to produce such concentrated nitric acid (90–95% strength).

In one of the known methods used for concentrating weak nitric acid, a mixture of strong sulphuric acid and weak nitric acid is passed down through a tower against a countercurrent of steam. Strong nitric acid is produced by the condensation of the acid distilled from the mixture, and the water in the weak acid and steam goes into the sulphuric acid which is then drawn off as a relatively weak acid.

In the manufacture of sulphuric acid by the contact process, a gas containing sulphuric anhydride ($SO_3$) is first produced and then converted into sulphuric acid ($H_2SO_4$) by combination and condensation with water. It will be noted that in the production of mixed acid two processes are to be considered, first, the nitric acid process (oxidation of ammonia) in which an excess of water is present in the system, and second, the sulphuric acid process in which it is necessary to add water to the sulphuric anhydride formed.

According to my improved process in making mixed acid in a continuous and unitary operation, the essentially novel features reside in removing moisture or water from the nitric acid system where it is in excess of that required and then transferring same to the sulphuric acid process when such water is required. In some instances a balanced condition will exist in the integration of these joint operations, though in others the amount of moisture or water produced from the nitric acid process will be insufficient for that required in the sulphuric acid process in which case additional water may be supplied to the sulphuric acid system. In my improved methods, I utilize the water formed by the oxidation of ammonia to hydrate the sulphuric anhydride ($SO_3$) produced in the sulphuric acid process, which greatly simplifies the manufacture of the mixed acid of the required strength.

The detailed procedure of the improved process for making such mixed acid will now be described in connection with the apparatus diagrammatically shown in the accompanying flow-sheet drawing.

On the left side of the drawing I have shown the essential parts of a contact sulphuric acid system involved in my process. On the right is shown the essential parts of an ammonia oxidation nitric acid plant employed in the unitary system for mixed acid manufacture according to my improved process.

The $SO_2$ burner gas in the contact sulphuric acid system enters the converter system A where the $SO_2$ is oxidized to $SO_3$. The $SO_3$ gas is partly cooled in the cooler B and then passes to the absorber C where it is absorbed in strong sulphuric acid circulated by the pump D through the absorber C and acid cooler E. The waste gas leaves the absorber C, and the $SO_3$ now in the form of $H_2SO_4$ passes through acid cooler E to the mixer F. The amount of sulphuric acid drawn off into the mixer F may be equivalent to the $H_2SO_4$ produced from the $SO_3$ in the burner gas, or part of this acid may be drawn off from the cooler E for other uses. The water for combination with the $SO_3$ comes, as shown, wholly or in part from the dehydrator in the nitric acid system.

Ammonia ($NH_3$) and air in the nitric acid process are drawn or blown by any suitable means through the oxidizer unit G. The hot gases containing oxides of nitrogen and moisture are then partly cooled in the cooler H and then pass to the dehydrator I where part of the strong absorbing acid ($H_2SO_4$) is circulated by the pump D over the dehydrating tower I and contacted with the gases from the cooler H. Due partially to the heat in these gases, the oxides of nitrogen will pass through the dehydrator I, but the moisture in the gas will be partly absorbed by the sulphuric acid and be carried as relatively weaker $H_2SO_4$ to the absorber C for hydration of the $SO_3$ in such absorber C to form sulphuric acid.

The amount of acid circulated over the dehydrator I may be regulated so that only part of the moisture is removed from the gases and a ready control of the strength of the nitric acid subsequently formed is thereby made available. The partially dehydrated gases are partly cooled in the cooler J and then oxidized and condensed in the tower K. The strong nitric acid may be now wholly passed to the mixer F for the production of mixed acid, or such nitric acid may be withdrawn from the condenser K as required.

It will be observed that any excess sulphuric acid produced may be withdrawn and otherwise used instead of being combined with the nitric acid in the mixer F to form the mixed acid, and that in like manner under certain conditions of operation an excess of strong nitric acid may also be produced and withdrawn from my unitary system. The essential features in the operation of my process are the abstraction of moisture or water from the gases in the ammonia oxidation nitric acid plant with the immediate and continuous use of such moisture for the hydration of sulphuric anhydride in a contact sulphuric acid process, and also avoiding the production of weak sulphuric acid that will require expensive concentration. In other words I have integrated two independent operations for the production of sulphuric acid and nitric acid with the formation of strong mixtures of these acids with no free water due primarily to the utilization of the moisture derived from the nitric acid system for hydrating the sulphur trioxide produced in the sulphuric acid process with no formation of weak sulphuric acid as a separated product to be disposed of anywhere throughout my improved process.

I claim as my invention:—

1. A process for making mixed acid which comprises absorbing sulphur trioxide gas formed in a contact sulphuric acid process with sulphuric acid, partially removing moisture from the gases containing oxides of nitrogen and moisture produced in an ammonia oxidation nitric acid process with said resulting sulphuric acid, forming nitric acid from said partially dehydrated nitrous gases hydrating the sulphuric anhydride produced in the first step with the relatively weaker sulphuric acid formed by such dehydration, and mixing the resulting sulphuric and nitric acids to form mixed acid.

2. In a process for making mixed acid, the steps which comprise absorbing sulphur trioxide gas formed in a contact sulphuric acid process with sulphuric acid in circulation, partially removing moisture from the gas produced in an ammonia oxidation nitric acid process with controlled amounts of said sulphuric acid in circulation, oxidizing and condensing the partially dehydrated gases to form nitric acid, hydrating with said removed moisture sulphuric anhydride produced in the sulphuric acid process to form $H_2SO_4$, and mixing the resulting acids.

CYRIL B. CLARK.